United States Patent
Kon (10) Patent No.: US 10,830,973 B2
(45) Date of Patent: Nov. 10, 2020

(54) OPTICAL RECEPTACLE, OPTICAL MODULE, AND METHOD FOR MANUFACTURING OPTICAL MODULE

(71) Applicant: Enplas Corporation, Saitama (JP)

(72) Inventor: Ayano Kon, Saitama (JP)

(73) Assignee: ENPLAS CORPORATION, Saitama (JP)

(*) Notice: Subject to any disclaimer, the term of this patent is extended or adjusted under 35 U.S.C. 154(b) by 0 days.

(21) Appl. No.: 16/468,302

(22) PCT Filed: Nov. 14, 2017

(86) PCT No.: PCT/JP2017/040852
§ 371 (c)(1),
(2) Date: Jun. 11, 2019

(87) PCT Pub. No.: WO2018/110181
PCT Pub. Date: Jun. 21, 2018

(65) Prior Publication Data
US 2020/0088962 A1    Mar. 19, 2020

(30) Foreign Application Priority Data
Dec. 13, 2016 (JP) .................. 2016-241337

(51) Int. Cl.
*G02B 6/42* (2006.01)
(52) U.S. Cl.
CPC ......... *G02B 6/4292* (2013.01); *G02B 6/4214* (2013.01); *G02B 6/4239* (2013.01)

(58) Field of Classification Search
CPC .................................. G02B 6/42–43
See application file for complete search history.

(56) References Cited

U.S. PATENT DOCUMENTS

| 9,645,330 B2* | 5/2017 | Kon ................. G02B 6/425 |
| 9,939,594 B2* | 4/2018 | Morioka .......... G02B 6/4214 |
| 10,268,001 B2* | 4/2019 | Chen ............... G02B 6/4204 |

(Continued)

FOREIGN PATENT DOCUMENTS

| JP | 2004-246279 A | 9/2004 |
| JP | 2008-040318 A | 2/2008 |

(Continued)

OTHER PUBLICATIONS

International Search Report from International Application No. PCT/JP2017/040852 dated Feb. 20, 2018.

*Primary Examiner* — John Bedtelyon
(74) *Attorney, Agent, or Firm* — Brundidge & Stanger, P.C.

(57) ABSTRACT

This optical receptacle has an optical receptacle body, a support member, and an adhesive. The optical receptacle body has a first optical surface, a second optical surface, and a reflective surface. The support member includes: a support member body; a through hole, into which a portion of the optical receptacle body is exposed; and a first contact portion that is in contact with a rear surface side of the optical receptacle body. The adhesive is in contact with the portion of the optical receptacle body exposed into the through-hole, and the inner surface of the through-hole. Furthermore, the optical receptacle is disposed more on the support member side than a mounting surface.

12 Claims, 9 Drawing Sheets

(56) References Cited

U.S. PATENT DOCUMENTS

| | | | |
|---|---|---|---|
| 10,627,586 B2* | 4/2020 | Morioka | G02B 6/4214 |
| 2004/0202477 A1 | 10/2004 | Nagasaka et al. | |
| 2008/0036103 A1 | 2/2008 | Ban et al. | |
| 2008/0232737 A1 | 9/2008 | Ishigami et al. | |
| 2012/0027364 A1 | 2/2012 | Tamura et al. | |
| 2014/0233897 A1 | 8/2014 | Ishikawa et al. | |
| 2020/0073062 A1* | 3/2020 | Sukegawa | G02B 6/4201 |

FOREIGN PATENT DOCUMENTS

| | | |
|---|---|---|
| JP | 2009-122354 A | 6/2009 |
| JP | 2012-032574 A | 2/2012 |
| JP | 2013-109311 A | 6/2013 |
| JP | 2013-225160 A | 10/2013 |
| JP | 2015-169772 A | 9/2015 |

\* cited by examiner

OPTICAL RECEPTACLE, OPTICAL MODULE, AND METHOD FOR MANUFACTURING OPTICAL MODULE

TECHNICAL FIELD

The present invention relates to an optical receptacle, an optical module including the optical receptacle, and a manufacturing method of the optical module.

BACKGROUND ART

Conventionally, in optical communications using an optical transmission member such as an optical fiber and an optical waveguide, an optical module including a light emitting element (optical element) such as a surface-emitting laser (e.g. a vertical-cavity surface-emitting laser (VCSEL)) has been used. Such an optical module includes an optical receptacle (optical socket) that operates such that light containing communication information emitted from a light emitting element is incident on an end surface of the optical transmission member (e.g. optical fiber).

For example, PTL 1 discloses an optical module including a substrate, an optical socket disposed on one surface of the substrate, and an optical element disposed on the other surface of the substrate at a position corresponding to the optical socket. A light plug supporting an end portion of a tape fiber is attached to the optical socket. In addition, the optical socket includes a first lens configured to allow entrance of light emitted from an optical element or emit, toward the optical element, light travelling inside from the tape fiber, a second lens configured to allow entrance of light emitted from the tape fiber or emit, toward the tape fiber, light travelling inside from the optical element, and a reflection surface configured to reflect, toward the second lens, light incident on the first lens, or reflect, toward the first lens, light incident on the second lens.

In the optical module disclosed in PTL 1, an optical element is fixed to one surface of the substrate by wire bonding or the like. Thereafter, the optical socket is fixed to the other surface of the substrate such that the optical axis of the optical element and the central axis of the first lens coincide with each other. Then, adhesive agent is applied to at least one of the optical socket and the substrate to bond the optical socket to the substrate.

CITATION LIST

Patent Literature

PTL 1
  Japanese Patent Application Laid-Open No. 2004-246279

SUMMARY OF INVENTION

Technical Problem

However, in the optical module disclosed in PTL 1, the optical socket is directly bonded on the substrate, and as such, the space for wire bonding, other optical components, electronic components and the like is limited in the substrate on which the optical socket is fixed. In addition, if the optical socket and the substrate are separated from each other by using a cover and the like for the optical socket, the stress of attaching/detaching the light plug to/from the optical socket may affect the bonding force between the optical socket and the cover.

In view of this, an object of the present invention is to provide an optical receptacle that can achieve higher degrees of freedom in design of wire bonding, other optical components and electronic components in comparison with conventional optical sockets. In addition, another object of the present invention is to provide an optical module including the optical receptacle. Yet another object of the present invention is to provide a method of manufacturing the optical module.

Solution to Problem

An optical receptacle according to an embodiment of the present invention is configured to be disposed between an optical transmission member and a photoelectric conversion device including a photoelectric conversion element disposed on a substrate, the optical receptacle being configured to optically couple the photoelectric conversion element and an end surface of the optical transmission member, the optical receptacle including: an optical receptacle main body; a supporting member configured to support the optical receptacle main body; and an adhesive agent configured to bond the optical receptacle and the supporting member. The optical receptacle main body includes a first optical surface disposed on a bottom surface side, the first optical surface being configured to allow incidence of transmission light emitted from the photoelectric conversion element, or to emit, toward the photoelectric conversion element, reception light having passed through inside of the optical receptacle main body after being emitted from the end surface of the optical transmission member, a second optical surface disposed on a front surface side, the second optical surface being configured to emit, toward the optical transmission member, the transmission light having passed through the inside of the optical receptacle main body after being emitted from the photoelectric conversion element, or to allow incidence of the reception light emitted from the optical transmission member, and a reflection surface configured to reflect, toward the second optical surface, the transmission light incident on the first optical surface, or to reflect, toward the first optical surface, the reception light incident on the second optical surface. The supporting member includes a supporting member main body including an installation surface for installation to the substrate, a through hole disposed to face a top surface of the optical receptacle main body located opposite the bottom surface of the optical receptacle main body, the through hole opening at an inner surface of the supporting member main body and at an outer surface of the supporting member main body located opposite the inner surface, wherein a part of the optical receptacle main body is exposed to inside of the through hole, and a first contact part configured to make contact with a back surface side of the optical receptacle main body that is located opposite a front surface of the optical receptacle main body in a state where the part of the optical receptacle main body is exposed to the inside of the through hole. The adhesive agent is disposed in the through hole such that the adhesive agent is in contact with the part of the optical receptacle main body exposed to the inside of the through hole and an internal surface of the through hole. The optical receptacle main body is located on a side of the supporting member with respect to the installation surface.

An optical module according to an embodiment of the present invention includes: a photoelectric conversion device including a substrate and a photoelectric conversion element disposed on the substrate; and the optical receptacle. The substrate and the optical receptacle main body are separated from each other.

A method of manufacturing the above-mentioned optical module according to an embodiment of the present invention, the method including: producing the optical receptacle by injecting the adhesive agent into the through hole in a state where the back surface side of the optical receptacle main body is in contact with the first contact part and a part of the optical receptacle main body is exposed to the inside of the through hole, and by curing the adhesive agent to bond the optical receptacle main body and the supporting member to each other; and fixing the optical receptacle to the photoelectric conversion device such that the substrate and the optical receptacle main body are separated from each other.

Advantageous Effects of Invention

According to the present invention, it is possible to provide an optical receptacle that can achieve higher degrees of freedom in design of wire bonding, other optical components and electronic components in comparison with conventional optical sockets.

DESCRIPTION OF EMBODIMENTS

Optical module 100 according to an embodiment of the present invention is described in detail below with reference to the accompanying drawings.

Configuration of Optical Module

Figure 1A:
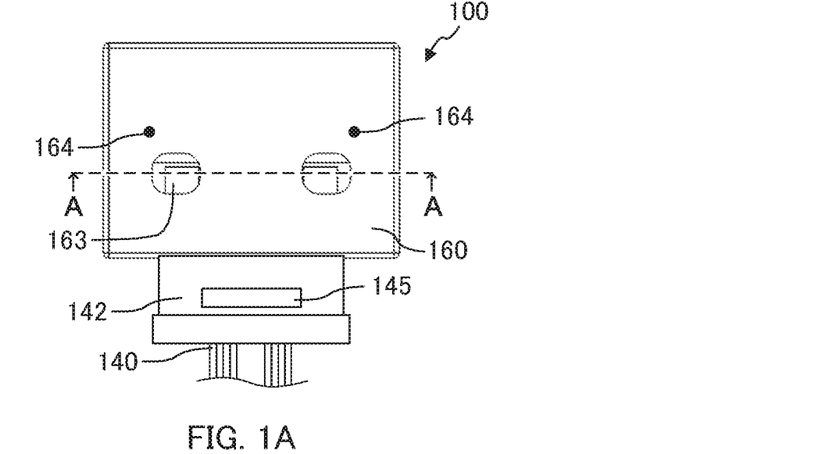
FIGS. 1A to 1C illustrate a configuration of an optical module according to an embodiment of the present invention.
Figure 1B:
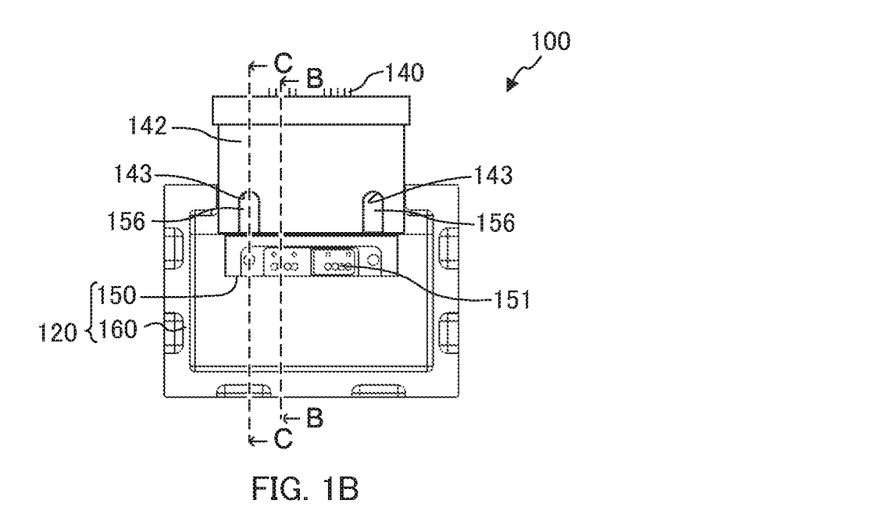
Figure 1C:
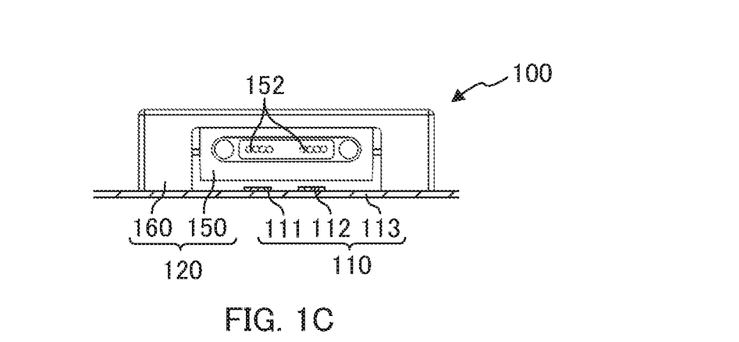
Figure 2A:
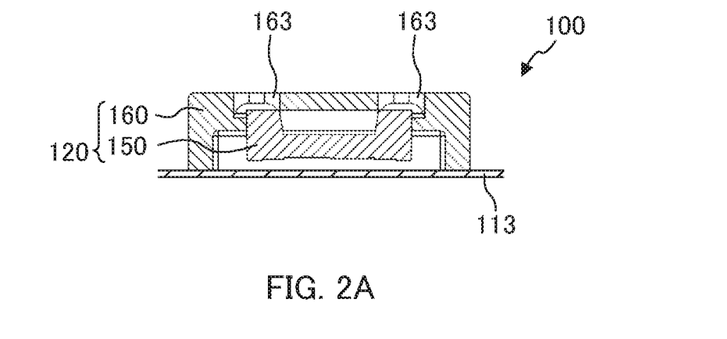
FIGS. 2A to 2C are sectional views of the optical module.
Figure 2B:
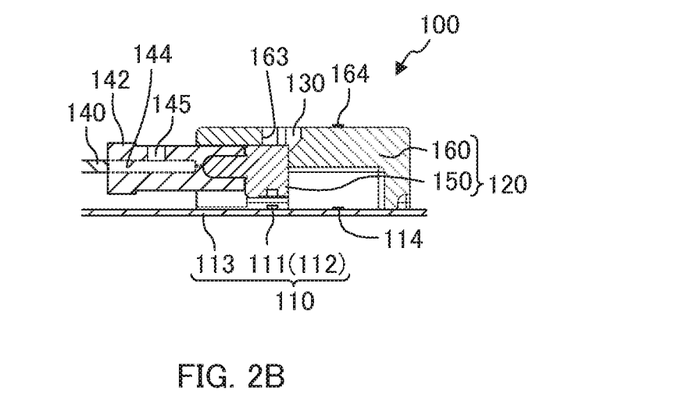
Figure 2C:
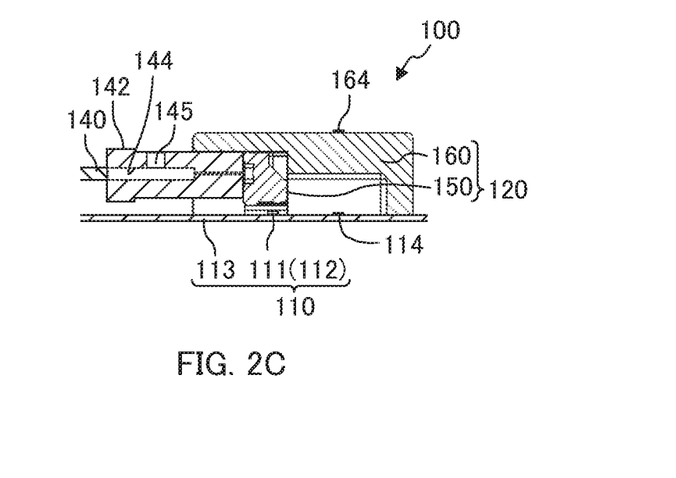

FIGS. 1A to 2C illustrate a configuration of optical module 100 according to an embodiment of the present invention. FIG. 1A is a plan view of the optical module, FIG. 1B is a bottom view of the optical module, and FIG. 1C is a front view of the optical module. FIG. 2A is a sectional view taken along line A-A of FIG. 1A, FIG. 2B is a sectional view taken along line B-B of FIG. 1B, and FIG. 2C is a sectional view taken along line C-C of FIG. 1B. Note that illustration of photoelectric conversion device 110 is omitted in FIGS. 1A and 1B, and illustration of optical transmission member 140 and ferrule 142 is omitted in FIG. 1C.

As illustrated in FIGS. 1A to 2C, optical module 100 includes photoelectric conversion device 110 of a substrate mounting type including photoelectric conversion elements such as light-emitting element 111 and light-receiving element 112; and optical receptacle 120. Optical module 100 is used in the state where optical transmission member 140 is connected with optical receptacle 120 with ferrule 142 therebetween.

Photoelectric conversion device 110 includes substrate 113 and a photoelectric conversion element. Optical module 100 for transmission uses light-emitting element 111 as a photoelectric conversion element. Optical module 100 for reception uses light-receiving element 112 as a photoelectric conversion element. Optical module 100 for transmission and reception uses light-emitting element 111 and light-receiving element 112 as photoelectric conversion elements. In the present embodiment, optical module 100 for transmission and reception including light-emitting element 111 and light-receiving element 112 is described.

Substrate 113 is, for example, a glass composite substrate, a glass epoxy substrate, a flexible substrate or the like. Light-emitting element 111 and light-receiving element 112 are disposed on substrate 113. In addition, first alignment mark 114 is formed in one surface of substrate 113 on which light-emitting element 111 and light-receiving element 112 are disposed.

Light-emitting element 111, which is disposed on substrate 113, emits laser light in a direction perpendicular to the surface of substrate 113 on which light-emitting element 111 is disposed. The number of light-emitting element 111 is not limited. In the present embodiment, four light-emitting elements 111 are provided. Also, the position of light-emitting element 111 is not limited. In the present embodiment, four light-emitting elements 111 are arranged at a constant interval along the arrangement direction of optical transmission member 140. Light-emitting element 111 is a vertical-cavity surface-emitting laser (VCSEL), for example. Note that in the case where optical transmission members 140 are arranged in two or more lines, the number of the lines of arranged light-emitting elements 111 may be identical to that of optical transmission members 140.

Light-receiving element 112 is disposed on substrate 113 and receives reception light emitted from optical transmission member 140. The number of light-receiving elements 112 is not limited. In the present embodiment, four light-receiving elements 112 are provided. Also, the position of light-receiving element 112 is not limited. In the present embodiment, four light-receiving elements 112 are arranged in one line at a constant interval along the arrangement direction of optical transmission member 140. To be more specific, in plan view of photoelectric conversion device 110, four light-receiving elements 112 are arranged on the straight line along which four light-emitting elements 111 are arranged. Light-receiving element 112 is a photodiode (PD), for example. Note that in the case where optical transmission members 140 are arranged in two or more lines, the number of the lines of the arranged light-receiving elements 112 may be identical to that of optical transmission members 140.

First alignment mark 114 is used in the method of manufacturing optical module 100 described later, as a reference for positioning optical receptacle 120 with respect to substrate 113. The configuration of first alignment mark 114 is not limited as long as the above-described function can be ensured. First alignment mark 114 may be a recess, a protrusion, or a painted pattern provided to substrate 113. In addition, the shape of first alignment mark 114 in plan view may be, but not limited to, a circle or a polygon. Also, the position of first alignment mark 114 is not limited. As viewed from the photoelectric conversion element (light-emitting element 111 and light-receiving element 112), first alignment mark 114 may be disposed on the optical transmission member 140 side, or on the side opposite to optical transmission member 140. In the present embodiment, first alignment mark 114 is disposed on the side opposite to optical transmission member 140 as viewed from the photoelectric conversion element (light-emitting element 111 and light-receiving element 112).

The type of optical transmission member 140 is not limited, and optical transmission member 140 may be an optical fiber, a light waveguide or the like. In the present embodiment, optical transmission member 140 is an optical fiber. The optical fiber may be of a single mode type, or a multiple mode type. The number of optical transmission member 140 is not limited. In the present embodiment, eight optical fibers are arranged in one line at a constant interval. Note that optical transmission member 140 may be arranged in two or more lines.

Ferrule 142 holds an end portion of optical transmission member 140, and sets the position of an end surface of optical transmission member 140 with respect to second optical surface 152 of optical receptacle main body 150. Ferrule 142 is configured to hold an end portion of optical transmission member 140, and is configured to be detachable with respect to optical receptacle main body 150. Ferrule 142 is formed in a cylindrical shape. Optical transmission member 140 is inserted to hollow region 144 of ferrule 142. In addition, a pair of ferrule recesses 143 are formed on both sides of hollow region 144 of ferrule 142. Further, adhesive agent inlet 145 communicated with hollow region 144 is formed in the top surface of ferrule 142. By inserting optical transmission member 140 to the hollow region of ferrule 142 and pouring adhesive agent 130 from adhesive agent inlet 145, optical transmission member 140 is fixed to ferrule 142.

In the state where optical receptacle 120 is disposed between the photoelectric conversion element and optical transmission member 140, optical receptacle 120 optically connects the light-emitting surfaces of a plurality of light-emitting elements 111 and end surfaces of a plurality of optical transmission members 140 in one-to-one relationship. In addition, optical receptacle 120 optically couples the light reception surfaces of a plurality of light-receiving elements 112 and the end surfaces of a plurality of optical transmission members 140 in one-to-one relationship. The configuration of optical receptacle 120 is now described in detail.

Configuration of Optical Receptacle

Optical receptacle 120 includes optical receptacle main body 150, supporting member 160 for supporting optical receptacle main body 150, and adhesive agent 130 for bonding optical receptacle main body 150 and supporting member 160 to each other. The "adhesive agent" herein means to include an uncured adhesive agent having a predetermined fluidity, and a cured product.

Figure 3:
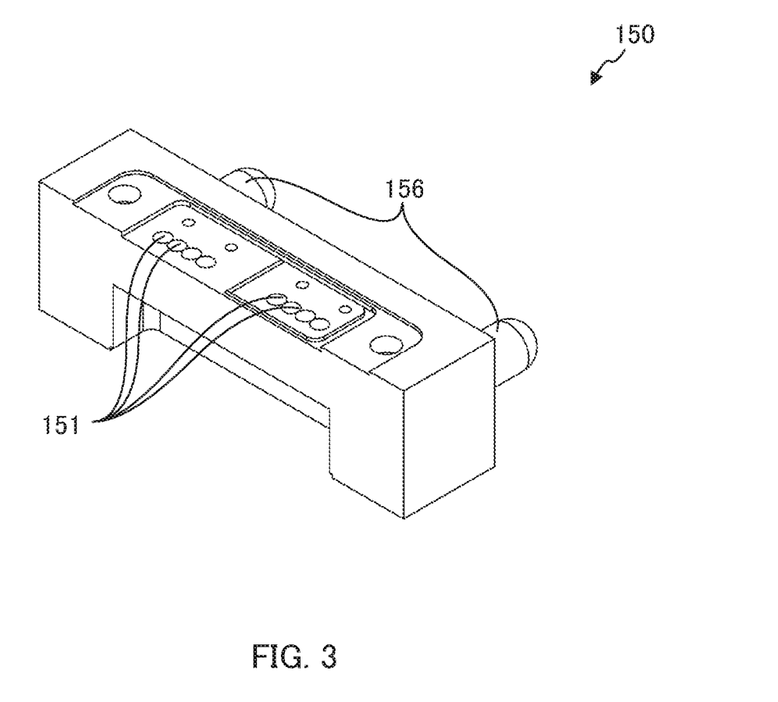
FIG. 3 is a perspective view of an optical receptacle main body.
Figure 4A:
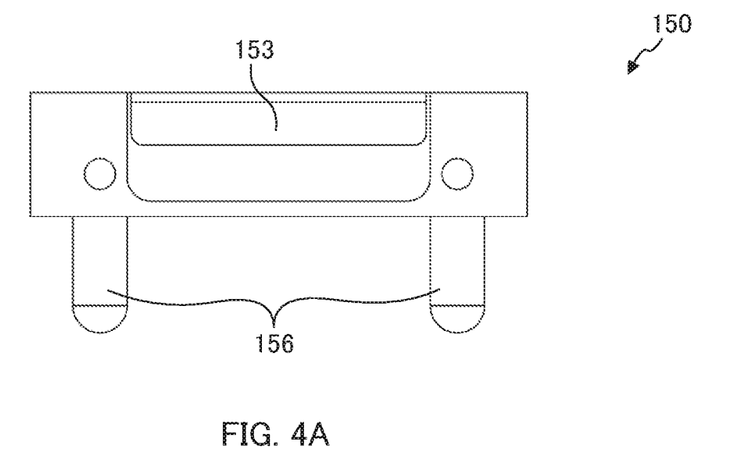
FIGS. 4A to 4C illustrate a configuration of the optical receptacle main body.
Figure 4B:
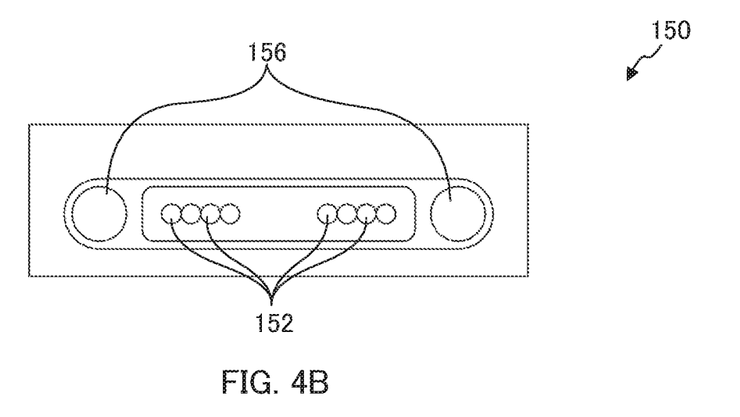
Figure 4C:
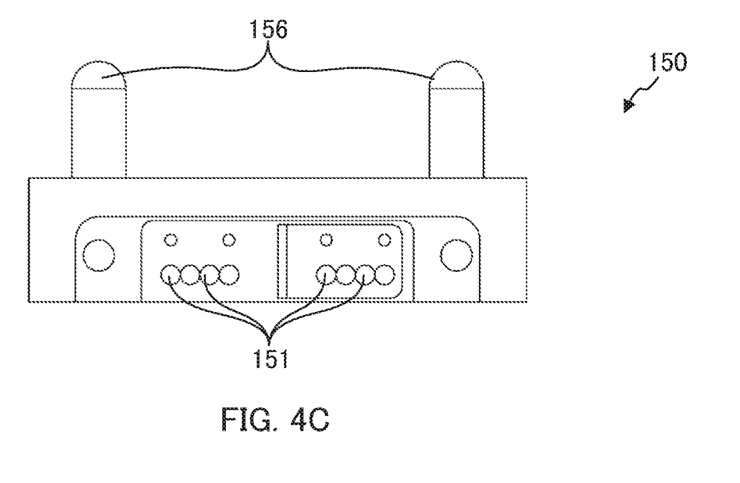
Figure 5A:
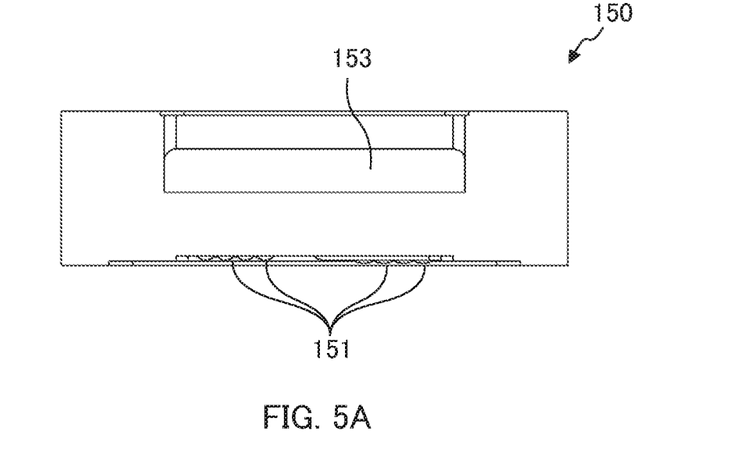
FIGS. 5A and 5B illustrate a configuration of the optical receptacle main body.
Figure 5B:
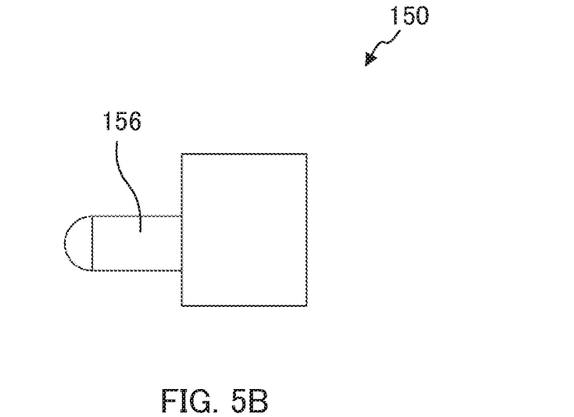

FIGS. 3 to 5B illustrate a configuration of optical receptacle main body 150. FIG. 3 is a perspective view of optical receptacle main body 150 as viewed from first optical surface 151 side. FIG. 4A is a plan view of optical receptacle main body 150, FIG. 4B is a front view of optical receptacle main body 150, and FIG. 4C is a bottom view of optical receptacle main body 150. FIG. 5A is a back view of optical receptacle main body 150, and FIG. 5B is a right side view of optical receptacle main body 150.

As illustrated in FIGS. 3 to 5B, optical receptacle main body 150 is a member having a substantially cuboid shape. Optical receptacle main body 150, which is optically transparent, emits, toward the end surface of optical transmission member 140, transmission light emitted from the light-emitting surface of light-emitting element 111, and emits, toward the light reception surface of light-receiving element 112, reception light emitted from optical transmission member 140. Optical receptacle main body 150 includes a plurality of first optical surfaces 151 disposed on the bottom surface side, a plurality of second optical surfaces 152 disposed on the front surface side, reflection surface 153, and ferrule protrusion 156. Optical receptacle main body 150 is formed of a material that is transparent to wavelengths of the light used for optical communications. Examples of such a material include transparent resins such as polyetherimide (PEI) and cyclic olefin resin.

The shape of optical receptacle main body 150 is not limited as long as the above-described functions are ensured and a part of optical receptacle main body 150 can be exposed to the inside of through hole 163 of supporting member 160 described later. In the present embodiment, optical receptacle main body 150 has a substantially cuboid shape.

First optical surface 151 is an optical surface that allows transmission light emitted from light-emitting element 111 to enter optical receptacle main body 150 while refracting the light. Also, first optical surface 151 emits, toward light-receiving element 112, reception light from optical transmission member 140 that has travelled inside optical receptacle 120 while refracting the light. In the present embodiment, first optical surface 151 has a shape of a convex lens surface protruding toward light-emitting element 111 (light-receiving element 112). First optical surface 151 converts transmission light emitted from light-emitting element 111 into collimated light. In addition, first optical surface 151 causes convergence of collimated light (reception light) having travelled inside optical receptacle 120. In addition, in the present embodiment, a plurality of (eight) first optical surfaces 151 are disposed in one line along the arrangement direction of the light-emitting surface of light-emitting element 111 and the light reception surface of light-receiving element 112 on the bottom surface side of optical receptacle 120 such that the plurality of (eight) first optical surfaces 151 are respectively disposed opposite the light-emitting surfaces of light-emitting elements 111 and the light reception surfaces of light-receiving elements 112. In addition, the height of first optical surface 151 with respect to the photoelectric conversion element (light-emitting element 111 or light-receiving element 112) is not limited and may be appropriately set. In addition, first optical surface 151 has a circular shape in plan view. Preferably, the central axis of first optical surface 151 is perpendicular to the light-emitting surface of light-emitting element 111 and the light reception surface of light-receiving element 112. In addition, preferably, the central axis of first optical surface 151 matches the optical axis of light emitted from light-emitting element 111 (reception light incident on light-receiving element 112).

Light having been entered from first optical surface 151 advances toward reflection surface 153. In addition, reception light emitted from first optical surface 151 advances toward light-receiving element 112. Note that in the case where light-emitting elements 111 and light-receiving elements 112 are arranged in two or more lines, the number of the lines of arranged first optical surfaces 151 is identical to that of light-emitting elements 111 and light-receiving elements 112.

In the present embodiment, eight first optical surfaces 151, four first optical surfaces 151 on the right side are transmission-side first optical surfaces 151, and four first optical surfaces 151 on the left side are reception-side first optical surfaces 151 as illustrated in FIG. 3 and FIG. 4C. That is, transmission light from light-emitting element 111 is incident on four transmission-side first optical surfaces 151 on the right side in the drawing, and reception light having travelled inside optical receptacle main body 150 is emitted from four reception-side first optical surfaces 151 on the left side in the drawing. In this manner, in optical receptacle main body 150 according to the present embodiment, one region, with respect to a plane that equally divides eight first optical surfaces 151 and is perpendicular to substrate 113, functions as the transmission side region, and the other region functions as the reception side region.

Second optical surface 152 is an optical surface that emits, toward the end surface of optical transmission member 140, transmission light having been entered from first optical surface 151 and having been reflected by reflection surface 153. Also, second optical surface 152 is an optical surface that allows, to enter optical receptacle 120, reception light emitted from the end surface of optical transmission member 140 while refracting the light. In the present embodiment, second optical surface 152 has a shape of a convex lens protruding toward the end surface of optical transmission member 140. Second optical surface 152 causes transmission light having travelled inside optical receptacle main body 150 to converge toward the end surface of optical transmission member 140, and converts reception light emitted from the end surface of optical transmission member 140 into collimated light. In addition, in the present embodiment, a plurality of (eight) second optical surfaces 152 are arranged in one line along the arrangement direction of optical transmission member 140 on the front surface side of optical receptacle 120 such that each of second optical surfaces 152 is opposite to the end surface of optical transmission member 140. In addition, second optical surface 152 has a circular shape in plan view. Preferably, the central axis of second optical surface 152 is perpendicular to the end surface of optical transmission member 140. In addition, preferably, the central axis of second optical surface 152 matches the optical axis of light emitted from optical transmission member 140. Note that in the case where optical transmission members 140 are arranged in two or more lines, the number of the lines of arranged second optical surfaces 152 is identical to that of optical transmission members 140.

Reflection surface 153 is disposed on the top surface side of optical receptacle main body 150, and reflection surface 153 reflects, toward second optical surface 152, transmission light having been entered from first optical surface 151. In addition, reflection surface 153 reflects, toward first optical surface 151, reception light having been entered from second optical surface 152. In the present embodiment, reflection surface 153 is tilted such that the distance from second optical surface 152 (optical transmission member 140) increases in a direction from the top surface toward the bottom surface of optical receptacle 120. The inclination angle of reflection surface 153 is 45° with respect to the optical axis of transmission light having been entered from first optical surface 151 and the optical axis of reception light having been entered from second optical surface 152.

Ferrule protrusion 156 fits in ferrule recess 143 of ferrule 142. With this configuration, the position of the end surface of optical transmission member 140 is set with respect to optical receptacle main body 150. Ferrule protrusion 156 is disposed on both sides of second optical surfaces 152.

Figure 6A:
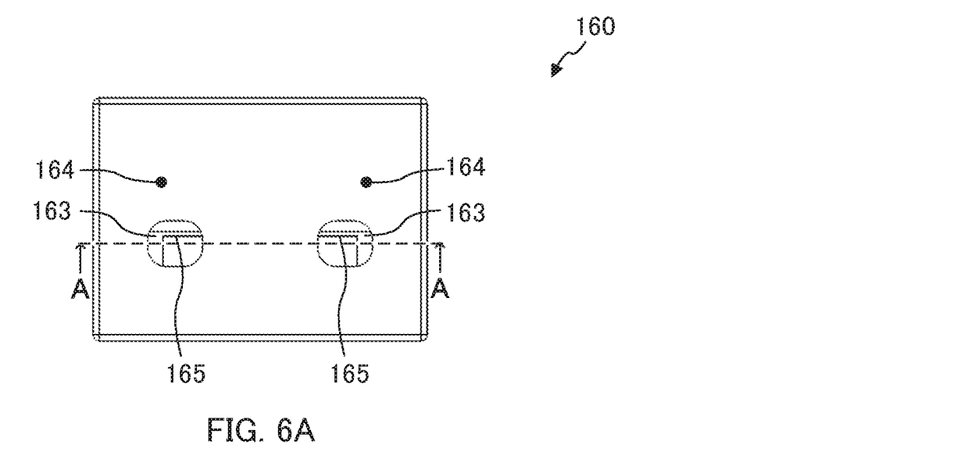
FIGS. 6A to 6C illustrate a configuration of a supporting member.
Figure 6B:
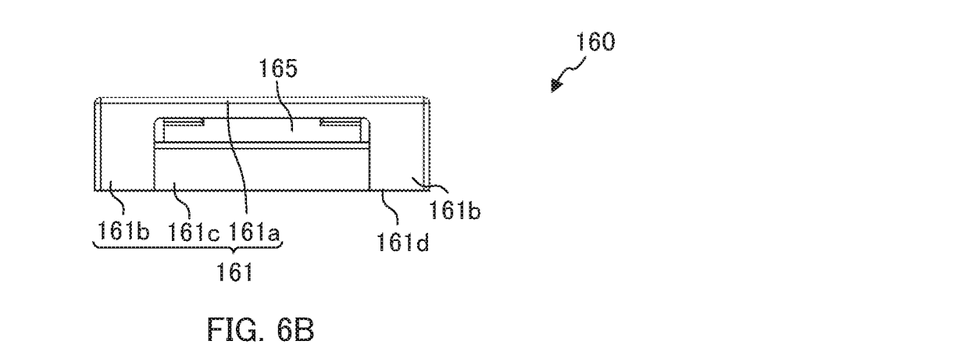
Figure 6C:
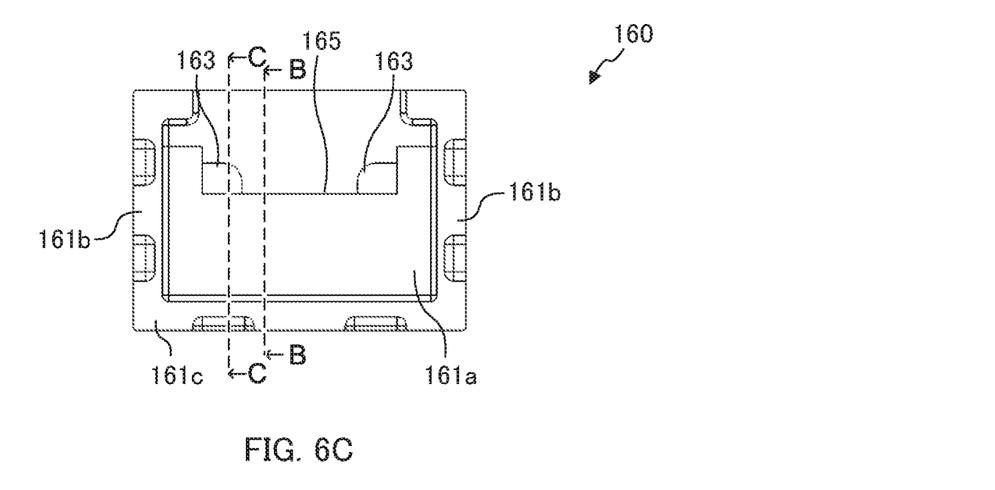
Figure 7A:
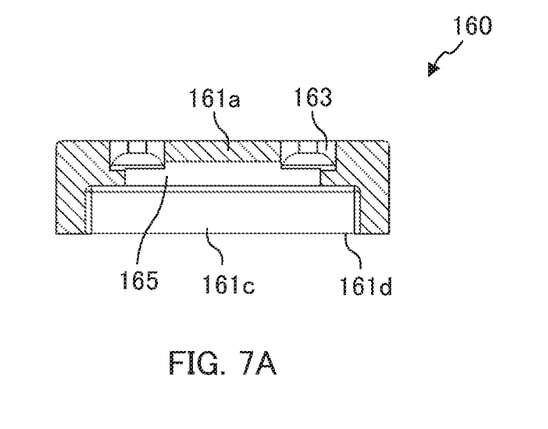
FIGS. 7A to 7C illustrate a configuration of the supporting member.
Figure 7B:
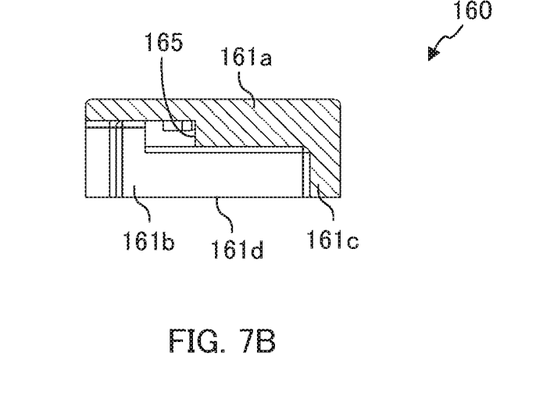
Figure 7C:
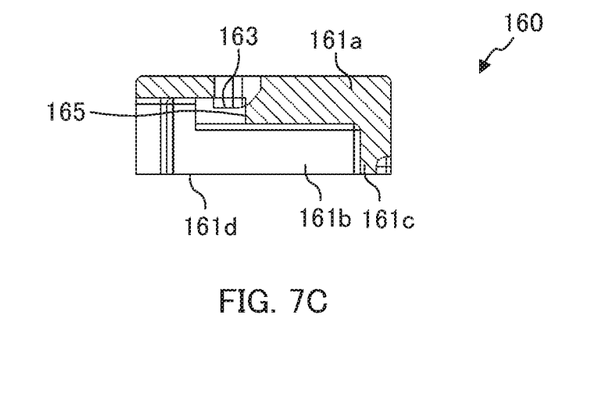

FIGS. 6A to 7C include a configuration of supporting member 160. FIG. 6A is a plan view of supporting member 160, FIG. 6B is a front view of supporting member 160, and FIG. 6C is a bottom view of supporting member 160. FIG. 7A is a sectional view taken along line A-A of FIG. 6A, FIG. 7B is a sectional view taken along line B-B of FIG. 6C, and FIG. 7C is a sectional view taken along line C-C of FIG. 6C.

Supporting member 160 supports optical receptacle main body 150 such that substrate 113 and optical receptacle main body 150 are separated from each other. As illustrated in FIGS. 6A to 7C, supporting member 160 includes supporting member main body 161, through hole 163, and first contact part 165. The material of supporting member 160 may be or may not be optically transparent. In the present embodiment, supporting member 160 is made of an optically transparent resin such as polycarbonate (PC), polyetherimide (PEI), and polyether sulfone (PES).

Supporting member main body 161 supports optical receptacle main body 150 such that substrate 113 and optical receptacle main body 150 are separated from each other. As long as such a function can be ensured, the shape of supporting member main body 161 is not limited. In the present embodiment, the shape of supporting member main body 161 includes top plate 161a, a pair of side plates 161b and 161b that surround a part of top plate 161a, and back plate 161c that surrounds another part of top plate 161a so as to connect top plate 161a and the pair of side plates 161b and 161b.

First contact part 165 is disposed inside supporting member main body 161. The bottom surfaces of the pair of side plates 161b and 161b and the bottom surface of back plate 161c function as installation surface 161d for installing optical receptacle 120 on substrate 113. Second alignment mark 164 is formed outside top plate 161a. In addition, through hole 163 is formed in top plate 161a. The heights of the pair of side plates 161b and 161b are greater than that of optical receptacle main body 150. With this configuration, optical receptacle main body 150 is disposed on supporting member 160 side with respect to installation surface 161d. In other words, when optical receptacle main body 150 is fixed inside top plate 161a of supporting member main body 161, a space is defined in the region lower than optical receptacle main body 150. In top plate 161a of supporting member main body 161, a portion on the back surface side is thicker than a front surface side portion thereof, and the thick portion exposed to the front surface side functions as surface first contact part 165.

Through hole 163 serves as a chamber for adhesive agent for bonding optical receptacle main body 150 and supporting member main body 161, and, at its inside, a part of optical receptacle main body 150 is exposed. The number of through holes 163 is not limited as long as optical receptacle main body 150 can be fixed with a good balance. In the present embodiment, in plan view of supporting member main body 161, two through holes 163 are formed in the horizontal direction. In supporting member main body 161, through hole 163 opens at the inner surface of top plate 161a and the outer surface opposite to the inner surface side. The opening at the inner surface of the through hole 163 in supporting member main body 161 is formed at positions opposite both corner portions of a back surface side upper part of optical receptacle main body 150.

The shape of through hole 163 is not limited as long as adhesive agent 130 can be injected from the outer surface side of supporting member main body 161, and a part of optical receptacle main body 150 is exposed at the inside thereof. In the present embodiment, the shape of the opening of through hole 163 on the outside of supporting member main body 161 is a rectangular with chamfered four corners. In addition, the opening of through hole 163 on the inside of supporting member main body 161 is closed with optical receptacle main body 150. As such, the opening of through hole 163 on the inside of supporting member main body 161 is dependent on the shape of the corner portion of optical receptacle main body 150. In the present embodiment, the opening of through hole 163 on the inside of supporting member main body 161 is formed to be closed with the corner portion. In addition, in the present embodiment, through hole 163 exposes, to the inside thereof, a part of the surface (top surface) of optical receptacle main body 150 that is seen when optical receptacle main body 150 is viewed from the top surface side, a part of the surface (back surface) of optical receptacle main body 150 that is seen when viewed from the back surface side, and a part of the surface (right side surface and left side surface) of optical receptacle main body 150 that is seen when optical receptacle main body 150 is viewed from the right or left side surface side.

In the state where the opening of through hole 163 on the inside of supporting member main body 161 is closed with optical receptacle main body 150, first contact part 165 makes contact with the back surface side of optical receptacle main body 150 so as to set the position of optical receptacle main body 150 with respect to supporting member 160 in the front-rear direction. With this configuration, in the method of manufacturing optical module 100 described later, the position of optical receptacle main body 150 with respect to supporting member 160 in the front-rear direction can be easily set. Here "the front-rear direction of optical receptacle main body 150" means a direction that connects the front surface and the back surface of optical receptacle main body 150, and is a light travelling direction between optical transmission member 140 and second optical surface 152. The shape of first contact part 165 is not limited as long as the above-described function can be ensured. The shape of first contact part 165 may be a protrusion disposed inside top plate 161a, or may be formed by varying the thickness of top plate 161a. In the present embodiment, first contact part 165 is a front end surface of a thick portion of top plate 161a of supporting member main body 161.

Second alignment mark 164 is used in the method of manufacturing optical module 100 described later, as a reference for positioning optical receptacle 120 with respect to substrate 113. The configuration of second alignment mark 164 is not limited as long as the above-described function can be ensured. Second alignment mark 164 may be a recess, a protrusion, or a painted pattern formed in top plate 161a. In addition, the shape of second alignment mark 164 in plan view may be, but not limited to, a circle or a polygon. In the present embodiment, in plan view of optical module 100, second alignment mark 164 overlaps first alignment mark 114 (see FIG. 2C).

Adhesive agent 130 is cured adhesive agent 130 supplied in through hole 163, and bonds optical receptacle main body 150 and supporting member main body 161. Adhesive agent 130 is disposed in the through hole so as to make contact with the inner surface of through hole 163 and the exterior surface of supporting member main body 161. In the present embodiment, adhesive agent 130 is in contact with a part of the surface (top surface) of optical receptacle main body 150 that is seen when optical receptacle main body 150 is viewed from the top surface side, a part of the surface (back surface) of optical receptacle main body 150 that is seen when viewed from the back surface side, a part of the surface (right side surface and left side surface) of optical receptacle main body 150 that is seen when optical receptacle main body 150 is viewed from the right or left side surface side, and the inner surface of through hole 163. The type of adhesive agent 130 is not limited as long as adhesive agent 130 can be injected into through hole 163, and optical receptacle main body 150 and supporting member main body 161 can be bonded to each other with a required strength. Examples of adhesive agent 130 include an epoxy resin adhesive agent and the like.

Configuration of Supporting Member of Modification

Figure 8A:
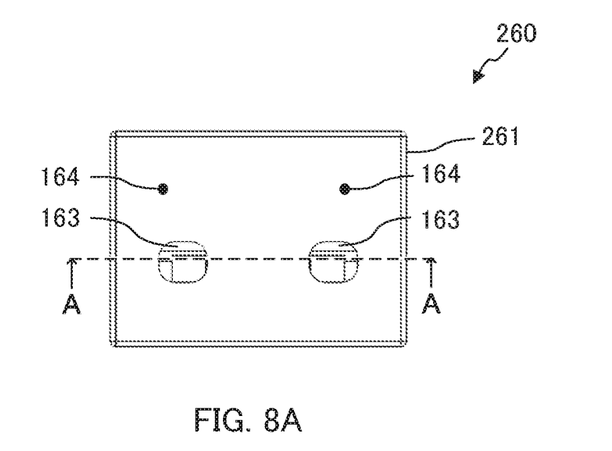
FIGS. 8A to 8C illustrate a configuration of a supporting member of a modification.
Figure 8B:
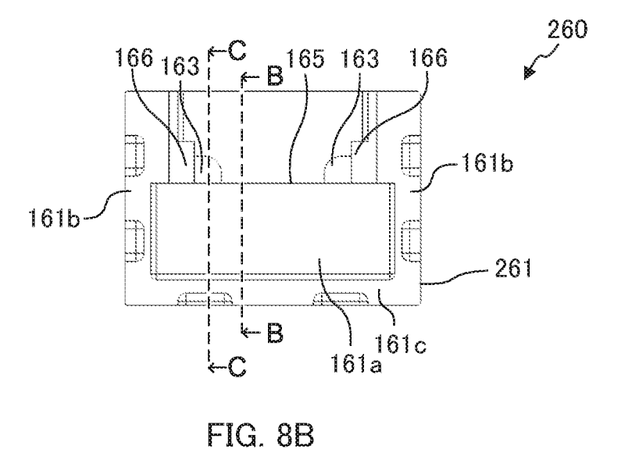
Figure 8C:
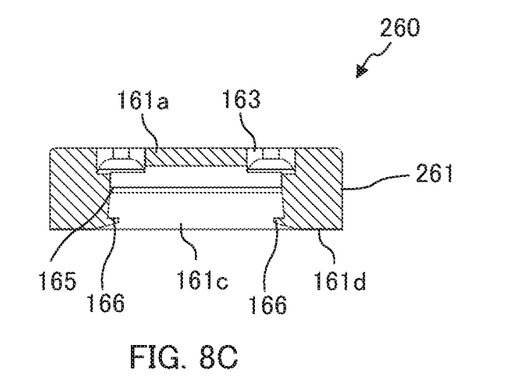
Figure 9A:
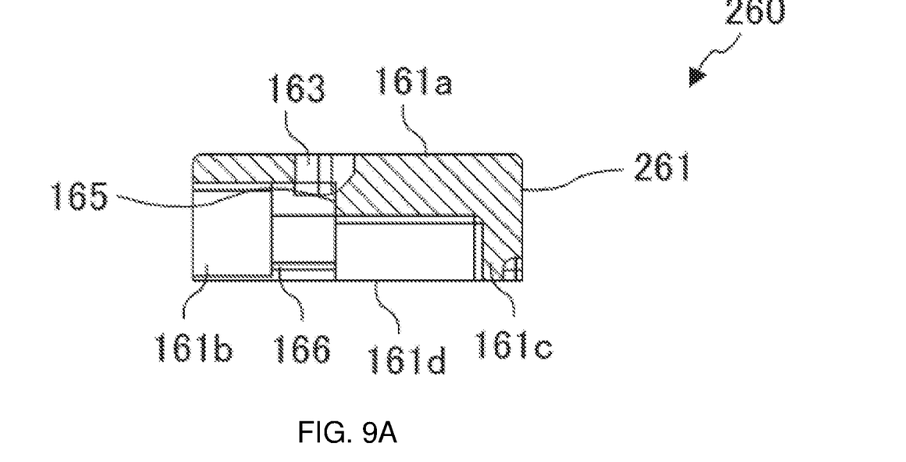
FIGS. 9A and 9B illustrate the configuration of the supporting member of the modification.
Figure 9B:
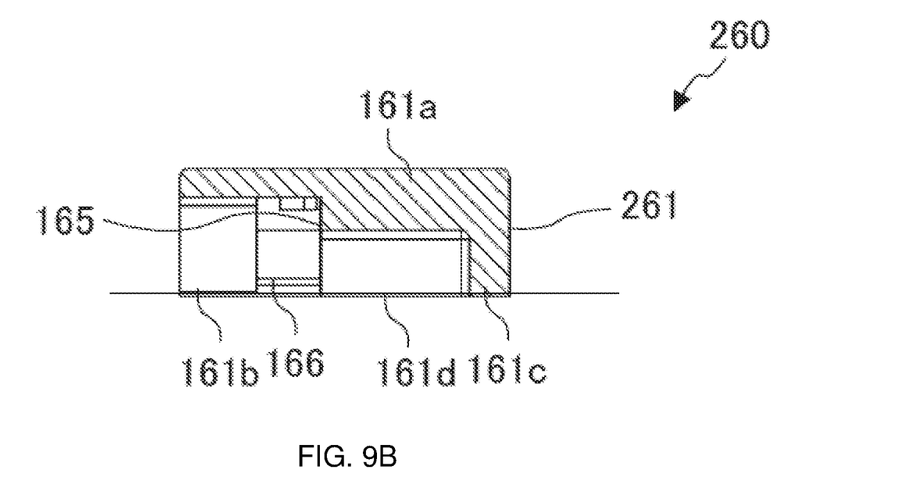

FIGS. 8A to 9B illustrate a configuration of supporting member 260 of a modification. FIG. 8A is a plan view of supporting member 260 of the modification, FIG. 8B is a bottom view of supporting member 260, and FIG. 8C is a sectional view taken along line A-A of FIG. 8A. FIG. 9A is a sectional view taken along line B-B of FIG. 8B, and FIG. 9B is a sectional view taken along line C-C of FIG. 8B.

As illustrated in FIGS. 8A to 9B, supporting member 260 of the modification includes supporting member main body 261, a pair of through holes 163 and first contact part 165 as with supporting member 160. Further, supporting member 260 includes second contact part 166.

In the state where the opening of through hole 163 on the inside of supporting member main body 161 is closed with optical receptacle main body 150, second contact part 166 makes contact with the bottom surface side of optical receptacle main body 150 so as to set the position of optical receptacle main body 150 in the vertical direction with respect to supporting member 260. With this configuration, in the method of manufacturing optical module 100 described later, the position of optical receptacle main body 150 in the vertical direction with respect to supporting member 260 can be easily set. Here "the vertical direction of optical receptacle main body 150" means a direction connecting the top surface and the bottom surface of optical receptacle main body 150, and is a light travelling direction between light-emitting element 111 (light-receiving element 112) and first optical surface 151. The shape of second contact part 166 is not limited as long as the above-described function can be ensured. In the present embodiment, second contact part 166 is a protrusion protruding inward from side plates 161b and 161b of supporting member main body 261. In addition, in the direction from the front surface toward the back surface of optical receptacle main body 150, the length of second contact part 166 is equal to that of optical receptacle main body 150 such that the bottom surface of optical receptacle main body 150 can be supported from the front surface to the back surface in the state where the opening of through hole 163 on the inside of supporting member main body 161 is closed with optical receptacle main body 150.

Method of Manufacturing Optical Module

Optical module 100 according to the present embodiment can be manufactured by the following method, for example. The method of manufacturing optical module 100 includes a step of producing optical receptacle 120, and a step of fixing optical receptacle 120 to photoelectric conversion device 110.

In the step of producing optical receptacle 120, optical receptacle main body 150 and supporting member 160 are separately shaped by injection molding, and thereafter optical receptacle main body 150 is mounted to supporting member 160. To be more specific, the back surface side of optical receptacle main body 150 is brought into contact with first contact part 165, and a predetermined portion of optical receptacle main body 150 is exposed to the inside of a pair of through holes 163. Next, with a dispenser for example, adhesive agent 130 is injected into through hole 163 of supporting member 160. Injected adhesive agent 130 is cured in this state, and thus optical receptacle main body 150 and supporting member 160 are bonded to each other. The injection amount of adhesive agent 130 is not limited as long as adhesive agent 130 can bond the inner surface of through hole 163 and optical receptacle main body 150. Regarding the injection amount of adhesive agent 130, through hole 163 may be completely or not completely filled with adhesive agent 130. In the present embodiment, adhesive agent 130 is injected to completely fill through hole 163. That is, in the present embodiment, adhesive agent 130 is in contact with the entire inner surface of through hole 163, a part of the surface (top surface) of optical receptacle main body 150 that is seen when optical receptacle main body 150 is viewed from the top surface side, a part of the surface (back surface) of optical receptacle main body 150 that is seen when viewed from the back surface side, and a part of the surface (right side surface and left side surface) of optical receptacle main body 150 that is seen when optical receptacle main body 150 is viewed from the right or left side surface side.

In the step of fixing optical receptacle 120 to photoelectric conversion device 110, optical receptacle 120 is fixed to photoelectric conversion device 110 on the basis of first alignment mark 114 and second alignment mark 164. To be more specific, optical receptacle 120 is positioned with respect to substrate 113 such that first alignment mark 114 and second alignment mark 164 overlap each other when optical module 100 is viewed from supporting member 160 side. Then, in the state where first alignment mark 114 and second alignment mark 164 overlap each other, substrate 113 and optical receptacle 120 (supporting member 160) are fixed with each other with adhesive agent 130, for example. With this configuration, optical module 100 is manufactured in the state where optical receptacle main body 150 and substrate 113 are separated from each other.

Effect

As described above, in optical receptacle 120 according to the present embodiment, optical receptacle main body 150 does not make contact with substrate 113 when optical receptacle 120 is disposed on substrate 113, and accordingly a space is interposed between substrate 113 and optical receptacle main body. Thus, optical receptacle 120 according to the present embodiment can achieve high degree of freedom for installation (design) of other optical components and electronic components. Further, by supplying adhesive agent 130 in the state where optical receptacle main body 150 is in contact with first contact part 165 and a part of optical receptacle main body 150 is exposed to the inside of through hole 163, optical receptacle main body 150 and supporting member 160 can be surely fixed, and therefore optical receptacle 120 can be easily assembled.

Note that in the method of manufacturing optical module 100 using supporting member 260 of the modification, the back surface side of optical receptacle main body 150 is brought into contact first contact part 165 and the bottom surface of optical receptacle main body 150 is brought into contact with second contact part 166, while a part of optical receptacle main body 150 is exposed to the inside of a pair of through holes 163. Next, with a dispenser and the like for example, adhesive agent 130 is injected into through hole 163 of supporting member 160. Adhesive agent 130 is cured in this state, and accordingly optical receptacle main body 150 and supporting member 260 are bonded to each other. Next, optical receptacle 120 is fixed to photoelectric conversion device 110 in the above-mentioned manner. With supporting member 260 of the modification, not only the front-rear direction of optical receptacle main body 150, but also the vertical direction of optical receptacle main body 150 can be positioned. Accordingly, it is not necessary to use a fixation jig unlike the case supporting member 160 is used, and thus optical receptacle 120 can be further easily assembled.

This application is entitled to and claims the benefit of Japanese Patent Application No. 2016-241337 filed on Dec. 13, 2016, the disclosure each of which including the specification, drawings and abstract is incorporated herein by reference in its entirety.

INDUSTRIAL APPLICABILITY

The optical receptacle and the optical module according to the embodiment of the present invention are suitable for optical communications using an optical transmission member, for example.

REFERENCE SIGNS LIST

100 Optical module
110 Photoelectric conversion device
111 Light-emitting element
112 Light-receiving element
113 Substrate
114 First alignment mark
120 Optical receptacle
130 Adhesive agent
140 Optical transmission member
142 Ferrule
143 Ferrule recess
144 Hollow region
145 Adhesive agent inlet
150 Optical receptacle main body
151 First optical surface
152 Second optical surface
153 Reflection surface
156 Ferrule protrusion
160, 260 Supporting member
161 Supporting member main body
161*a* Top plate
161*b* Side plate
161*c* Back plate
161*d* Installation surface
163 Through hole
164 Second alignment mark
165 First contact part
166 Second contact part

What is claimed is:

1. An optical receptacle configured to be disposed between an optical transmission member and a photoelectric conversion device including a photoelectric conversion element disposed on a substrate, the optical receptacle being configured to optically couple the photoelectric conversion element and an end surface of the optical transmission member, the optical receptacle comprising:
an optical receptacle main body;
a supporting member configured to support the optical receptacle main body; and
an adhesive agent configured to bond the optical receptacle and the supporting member, wherein the optical receptacle main body includes:
a first optical surface disposed on a bottom surface side, the first optical surface being configured to allow incidence of transmission light emitted from the photoelectric conversion element, or to emit, toward the photoelectric conversion element, reception light having passed through inside of the optical receptacle main body after being emitted from the end surface of the optical transmission member,
a second optical surface disposed on a front surface side, the second optical surface being configured to emit, toward the optical transmission member, the transmission light having passed through the inside of the optical receptacle main body after being emitted from the photoelectric conversion element, or to allow incidence of the reception light emitted from the optical transmission member, and
a reflection surface configured to reflect, toward the second optical surface, the transmission light incident on the first optical surface, or to reflect, toward the first optical surface, the reception light incident on the second optical surface,
wherein the supporting member includes:
a supporting member main body including an installation surface for installation to the substrate,
a through hole disposed to face a top surface of the optical receptacle main body located opposite the bottom surface of the optical receptacle main body, the through hole opening at an inner surface of the supporting member main body and at an outer surface of the supporting member main body located opposite the inner surface, wherein a part of the optical receptacle main body is exposed to inside of the through hole, and
a first contact part configured to make contact with a back surface side of the optical receptacle main body that is located opposite a front surface of the optical receptacle main body in a state where the part of the optical receptacle main body is exposed to the inside of the through hole,
wherein the adhesive agent is disposed in the through hole such that the adhesive agent is in contact with the part of the optical receptacle main body exposed to the inside of the through hole and an internal surface of the through hole, and
wherein the optical receptacle main body is located on a side of the supporting member with respect to the installation surface.

2. The optical receptacle according to claim 1, the supporting member further includes a second contact part configured to make contact with the bottom surface side of the supporting member main body in the state where the part of the optical receptacle main body is exposed to the inside of the through hole.

3. The optical receptacle according to claim 2,
wherein a part of a surface of the optical receptacle main body that is seen when viewed from a top surface side of the optical receptacle main body, a part of the surface of the optical receptacle main body that is seen when viewed from the back surface side, and a part of the surface of the optical receptacle main body that is seen when viewed from a right side surface side or a left side surface side of the optical receptacle main body are exposed to the inside of the through hole; and
wherein the adhesive agent is in contact with a part of the surface of the optical receptacle main body that is seen when viewed from the top surface side of the optical receptacle main body, the part of the surface of the optical receptacle main body that is seen when viewed from the back surface side, the part of the surface of the optical receptacle main body that is seen when viewed from the right side surface side or the left side surface side of the optical receptacle main body, and the internal surface of the through hole.

4. An optical module, comprising:
a photoelectric conversion device including a substrate and a photoelectric conversion element disposed on the substrate; and
the optical receptacle according to claim 3,
wherein the substrate and the optical receptacle main body are separated from each other.

5. A method of manufacturing the optical module according to claim 4, the method comprising:
producing the optical receptacle by injecting the adhesive agent into the through hole in a state where the back surface side of the optical receptacle main body is in contact with the first contact part and a part of the optical receptacle main body is exposed to the inside of the through hole, and by curing the adhesive agent to bond the optical receptacle main body and the supporting member to each other; and
fixing the optical receptacle to the photoelectric conversion device such that the substrate and the optical receptacle main body are separated from each other.

6. An optical module, comprising:
a photoelectric conversion device including a substrate and a photoelectric conversion element disposed on the substrate; and
the optical receptacle according to claim 2,
wherein the substrate and the optical receptacle main body are separated from each other.

7. A method of manufacturing the optical module according to claim 6, the method comprising:
producing the optical receptacle by injecting the adhesive agent into the through hole in a state where the back surface side of the optical receptacle main body is in contact with the first contact part and a part of the optical receptacle main body is exposed to the inside of the through hole, and by curing the adhesive agent to bond the optical receptacle main body and the supporting member to each other; and
fixing the optical receptacle to the photoelectric conversion device such that the substrate and the optical receptacle main body are separated from each other.

8. The optical receptacle according to claim 1,
wherein a part of a surface of the optical receptacle main body that is seen when viewed from a top surface side of the optical receptacle main body, a part of the surface of the optical receptacle main body that is seen when viewed from the back surface side, and a part of the surface of the optical receptacle main body that is seen when viewed from a right side surface side or a left side surface side of the optical receptacle main body are exposed to the inside of the through hole; and
wherein the adhesive agent is in contact with a part of the surface of the optical receptacle main body that is seen when viewed from the top surface side of the optical receptacle main body, the part of the surface of the optical receptacle main body that is seen when viewed from the back surface side, the part of the surface of the optical receptacle main body that is seen when viewed from the right side surface side or the left side surface side of the optical receptacle main body, and the internal surface of the through hole.

9. An optical module, comprising:
a photoelectric conversion device including a substrate and a photoelectric conversion element disposed on the substrate; and
the optical receptacle according to claim 8,
wherein the substrate and the optical receptacle main body are separated from each other.

10. A method of manufacturing the optical module according to claim 9, the method comprising:
producing the optical receptacle by injecting the adhesive agent into the through hole in a state where the back surface side of the optical receptacle main body is in contact with the first contact part and a part of the optical receptacle main body is exposed to the inside of the through hole, and by curing the adhesive agent to bond the optical receptacle main body and the supporting member to each other; and
fixing the optical receptacle to the photoelectric conversion device such that the substrate and the optical receptacle main body are separated from each other.

11. An optical module, comprising:
a photoelectric conversion device including a substrate and a photoelectric conversion element disposed on the substrate; and
the optical receptacle according to claim 1,
wherein the substrate and the optical receptacle main body are separated from each other.

12. A method of manufacturing the optical module according to claim 11, the method comprising:
producing the optical receptacle by injecting the adhesive agent into the through hole in a state where the back surface side of the optical receptacle main body is in contact with the first contact part and a part of the optical receptacle main body is exposed to the inside of the through hole, and by curing the adhesive agent to bond the optical receptacle main body and the supporting member to each other; and
fixing the optical receptacle to the photoelectric conversion device such that the substrate and the optical receptacle main body are separated from each other.

* * * * *